(12) United States Patent
Bhatnagar et al.

(10) Patent No.: US 10,704,866 B2
(45) Date of Patent: Jul. 7, 2020

(54) HIGH KINETIC ENERGY ABSORPTION WITH LOW BACK FACE DEFORMATION BALLISTIC COMPOSITES

(71) Applicant: HONEYWELL INTERNATIONAL INC., Morris Plains, NJ (US)

(72) Inventors: Ashok Bhatnagar, Richmond, VA (US); Gary Kratzer, Midlothian, VA (US); Charles Arnett, Richmond, VA (US); David A. Hurst, Richmond, VA (US); Steven Thomas Correale, Chester, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 238 days.

(21) Appl. No.: 15/678,420

(22) Filed: Aug. 16, 2017

(65) Prior Publication Data
US 2018/0075613 A1   Mar. 15, 2018

Related U.S. Application Data

(60) Provisional application No. 62/394,917, filed on Sep. 15, 2016.

(51) Int. Cl.
*F41H 5/04* (2006.01)
*G06T 7/00* (2017.01)
(Continued)

(52) U.S. Cl.
CPC ......... *F41H 5/0471* (2013.01); *G06T 7/0004* (2013.01); *G06T 7/55* (2017.01); *F41H 1/02* (2013.01); *G06T 2207/10016* (2013.01); *G06T 2207/30124* (2013.01); *G06T 2207/30212* (2013.01)

(58) Field of Classification Search
CPC ....... G01L 5/0052; G01L 5/14; G06T 7/0004; G06T 7/50; G06T 7/55; G06T 2207/10016; G06T 2207/30124; G06T 2207/30212; F41H 1/02; F41H 5/0471; F41H 5/0478; F41H 5/0485
USPC ........ 73/12.01, 78, 167, 783, 788, 826, 838, 73/866
See application file for complete search history.

(56) References Cited

U.S. PATENT DOCUMENTS

| | | |
|---|---|---|
| 8,357,767 B2 | 1/2013 | Moore et al. |
| 8,986,810 B2 | 3/2015 | Grunden et al. |

(Continued)

OTHER PUBLICATIONS

Dymeema® High-Strength, High-Modulus Polyethylene Fiber Fact Sheet, Royal DSM N.V. (http://www.pelicanrope.com/pdfs/Dyneema-Comprehensive-factsheet-UHMWPE.pdf)(2008).

(Continued)

*Primary Examiner* — Benjamin R Schmitt
(74) *Attorney, Agent, or Firm* — Roberts & Roberts, LLP; Richard S. Roberts, Jr.

(57) ABSTRACT

Viscoelastic, lightweight composite armor that is resistant to backface deformation, and to a method for evaluating the effectiveness of composite armor in resisting backface deformation. The index of retraction of a composite is determined by evaluating the degree of composite retraction at the site of impact of projectile after movement of the projectile is stopped. The degree of retraction indicates the ability of the composite to resist backface deformation.

11 Claims, 3 Drawing Sheets

(51) Int. Cl.
*G06T 7/55* (2017.01)
*F41H 1/02* (2006.01)

(56) References Cited

U.S. PATENT DOCUMENTS

| | | |
|---|---|---|
| 9,023,450 B2 | 5/2015 | Tam et al. |
| 9,023,451 B2 | 5/2015 | Tam et al. |
| 9,023,452 B2 | 5/2015 | Tam et al. |
| 9,163,335 B2 | 10/2015 | Tam et al. |
| 9,168,719 B2 | 10/2015 | Tam et al. |
| 9,169,581 B2 | 10/2015 | Tam et al. |
| 9,222,864 B2 | 12/2015 | Bhatnagar et al. |
| 2003/0199215 A1* | 10/2003 | Bhatnagar ............... B32B 27/04 442/135 |
| 2013/0059496 A1* | 3/2013 | Ardiff ...................... B32B 5/26 442/187 |

OTHER PUBLICATIONS

Honeywell Spectra® Fibers Fact Sheet, Honeywell International Inc. (https://www.honeywellspectra.com/products/fibers).

* cited by examiner

HIGH KINETIC ENERGY ABSORPTION WITH LOW BACK FACE DEFORMATION BALLISTIC COMPOSITES

CROSS-REFERENCE TO RELATED APPLICATION

This application claims the benefit of U.S. Provisional Application Ser. No. 62/394,917, filed on Sep. 15, 2016, the disclosure of which is incorporated by reference herein in its entirety.

BACKGROUND

Technical Field

The disclosure pertains to viscoelastic, lightweight composite armor that is resistant to backface deformation, and to a method for evaluating the effectiveness of composite armor in resisting backface deformation.

Description of the Related Art

Ballistic resistant articles fabricated from composites comprising high strength synthetic fibers are well known. Articles such as bullet resistant vests, helmets, vehicle panels and structural members of military equipment are typically made from fibrous composites that comprise a consolidated plurality of fibrous plies that are formed from high tenacity fibers, such as SPECTRA® polyethylene fibers or Kevlar® aramid fibers. For many applications, such as vests or parts of vests, the fibers may be formed into a woven or knitted fabric, with a plurality of fabrics being bonded or adjoined together, such as with an adhesive. For other applications, the fibers may be embedded in or coated with a polymeric matrix material and formed into nonwoven fabrics. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene ("UHMW PE"). Ballistic resistant composites fabricated from such high strength synthetic fibers exhibit varying degrees of resistance to penetration by high speed impact from projectiles such as bullets, shells, shrapnel and the like, as well as varying degrees of resistance to backface deformation resulting from the same projectile impact.

It is known that each type of high strength fiber has its own unique characteristics and properties. In this regard, one defining characteristic of a fiber is the ability of the fiber to bond with or adhere with surface coatings, such as polymeric binder coatings. Fibers having stronger bond strength at the fiber-binder interface have been found to be superior at dissipating the kinetic energy of high velocity projectiles, and a strong bond will resist the delamination of after a projectile impact. However, fiber surface finishes, which are typically used as fiber processing aids, can interfere with the interfacial adhesion or bonding of polymeric binder materials on fiber surfaces. Insufficient adhesion of polymeric binder materials on the fiber surfaces may reduce fiber-fiber bond strength and fiber-binder bond strength and thereby cause united fibers to disengage from each other and/or cause the binder to delaminate from the fiber surfaces. This can result in catastrophic product failure. A similar adherence problem is also recognized when attempting to apply protective polymeric compositions onto woven fabrics or knitted. Most significantly, this bond weakness detrimentally affects the ability of the armor to prevent blunt trauma injuries, i.e., injuries resulting from backface deformation. In this regard, when a bullet is stopped by composite armor, potentially resulting blunt trauma injuries may be as deadly to an individual as if the bullet had penetrated the armor and entered the body. This is especially consequential in the context of helmet armor, where the transient protrusion caused by a stopped bullet can still cross the plane of the wearer's skull and cause debilitating or fatal brain damage.

Many efforts have been made in the art to improve the ability of a composite to dissipate projectile kinetic energy and resist backface deformation without sacrificing either penetration resistance performance or low composite weight. In this regard, excellent results have been achieved by the techniques described in commonly-owned U.S. Pat. Nos. 8,986,810; 9,023,450; 9,023,451; 9,023,452; 9,163,335 and 9,168,719, all of which are incorporated by reference herein to the extent consisting with this disclosure. While the composite materials disclosed in said patents are known to achieve composite armor having excellent backface deformation resistance, there remains a need in the art for improved materials and improved methods for evaluating the ability of composites to resist backface deformation. The present disclosure provides a solution to this need in the art.

SUMMARY OF THE DISCLOSURE

Through extensive testing and analysis, it has been unexpectedly discovered that the ability of a fibrous composite to resist backface deformation can be measured by its viscoelasticity as characterized by its ability to retract after being impacted and deformed by a high energy projectile. When a high energy projectile such as a bullet fired from a rifle impacts a composite armor panel, the panel will deform at the site of impact. As the composite absorbs and dissipates the projectile kinetic energy, the panel deforms, causing the formation of a depression in its front surface and a corresponding protrusion from its rear surface. As the projectile moves forward, the panel resists its movement and works to stop it. Once the projectile is stopped, expansion of the protrusion ends and the composite begins to retract at the impact site, and the degree of retraction is indicative of the ability of the composite to resist backface deformation. It has also been unexpectedly found that the BFS of viscoelastic composites formed with both viscoelastic fibers and a viscoelastic polymeric binder (matrix) will be smaller than non-viscoelastic composites formed from non-viscoelastic components. This is because the viscoelastic composites have been found to stiffen when loaded suddenly, exhibiting a smaller time-to-peak displacement value, and thereby exhibiting comparatively less backface deformation when impacted with a projectile.

In order to determine the effectiveness of a composite in resisting backface deformation, the disclosure provides a process for determining an index of retraction of a flat composite panel, the process comprising:

a) providing a molded, flat composite panel comprising a consolidated plurality of fibrous plies, each of said fibrous plies comprising a plurality of viscoelastic fibers; said panel having a front surface and a rear surface;

b) firing a projectile at the front surface of said panel whereby the projectile impacts the panel at an impact site, and wherein the impact of the projectile causes a deflection of the panel at said impact site, whereby a depression is formed in the front surface of the panel and a corresponding rear protrusion is formed extending from the rear surface of the panel; wherein the flat composite panel stops the movement of said projectile, and wherein the rear protrusion partially retracts after the projectile is stopped, resulting in a transient deflection after the projectile is stopped but prior to the beginning of said retraction, and resulting in a permanent deflection after said partial retraction ends;

c) measuring the distance of said transient deflection from said rear surface and measuring the distance of said permanent deflection from said rear surface; and d) determining said index of retraction by determining the percent of retraction of said composite panel when comparing the transient deflection distance to the permanent deflection distance.

The disclosure also provides a process for evaluating the deflection resistance of flat composite panels, the process comprising:

a) providing a molded, flat composite panel comprising a consolidated plurality of fibrous plies, each of said fibrous plies comprising a plurality of viscoelastic fibers; said panel having a front surface and a rear surface;

b) firing a projectile at the front surface of said panel whereby the projectile impacts the panel at an impact site, and wherein the impact of the projectile causes a deflection of the panel at said impact site, whereby a depression is formed in the front surface of the panel and a corresponding rear protrusion is formed extending from the rear surface of the panel; wherein the flat composite panel stops the movement of said projectile, and wherein the rear protrusion partially retracts after the projectile is stopped, resulting in a transient deflection after the projectile is stopped but prior to the beginning of said retraction, and resulting in a permanent deflection after said partial retraction ends;

c) measuring the distance of said transient deflection from said rear surface and measuring the distance of said permanent deflection from said rear surface; and d) determining said index of retraction by determining the percent of retraction of said composite panel when comparing the transient deflection distance to the permanent deflection distance.

e) providing at least one additional molded, flat composite panel, each additional panel comprising a consolidated plurality of fibrous plies, each of said fibrous plies comprising a plurality of fibers, and each of said additional panels having a front surface and a rear surface; and wherein all panels have the same areal density;

f) repeating steps b)-d) for each additional panel to determine an index of retraction for each additional panel; and g) comparing the index of retraction determined for each panel to determine which panel has the highest index value, and thereby identifying the panel having the highest index value as superior to all the other panels.

The disclosure further provides a viscoelastic, deflection resistant fibrous composite panel comprising a consolidated plurality of fibrous plies, each of said fibrous plies comprising a plurality of viscoelastic fibers having a tenacity of at least 27 g/denier and said fibers having surfaces that are greater than 50% free of a fiber surface finish, wherein the fibers of said fibrous composite are coated with a viscoelastic binder material, wherein said binder is bonded to the fiber surfaces, and wherein the composite has an index of retraction of at least 17% when impacted by a projectile having sufficient kinetic energy to cause a deflection of the panel at its impact site.

DETAILED DESCRIPTION

Figure 1:
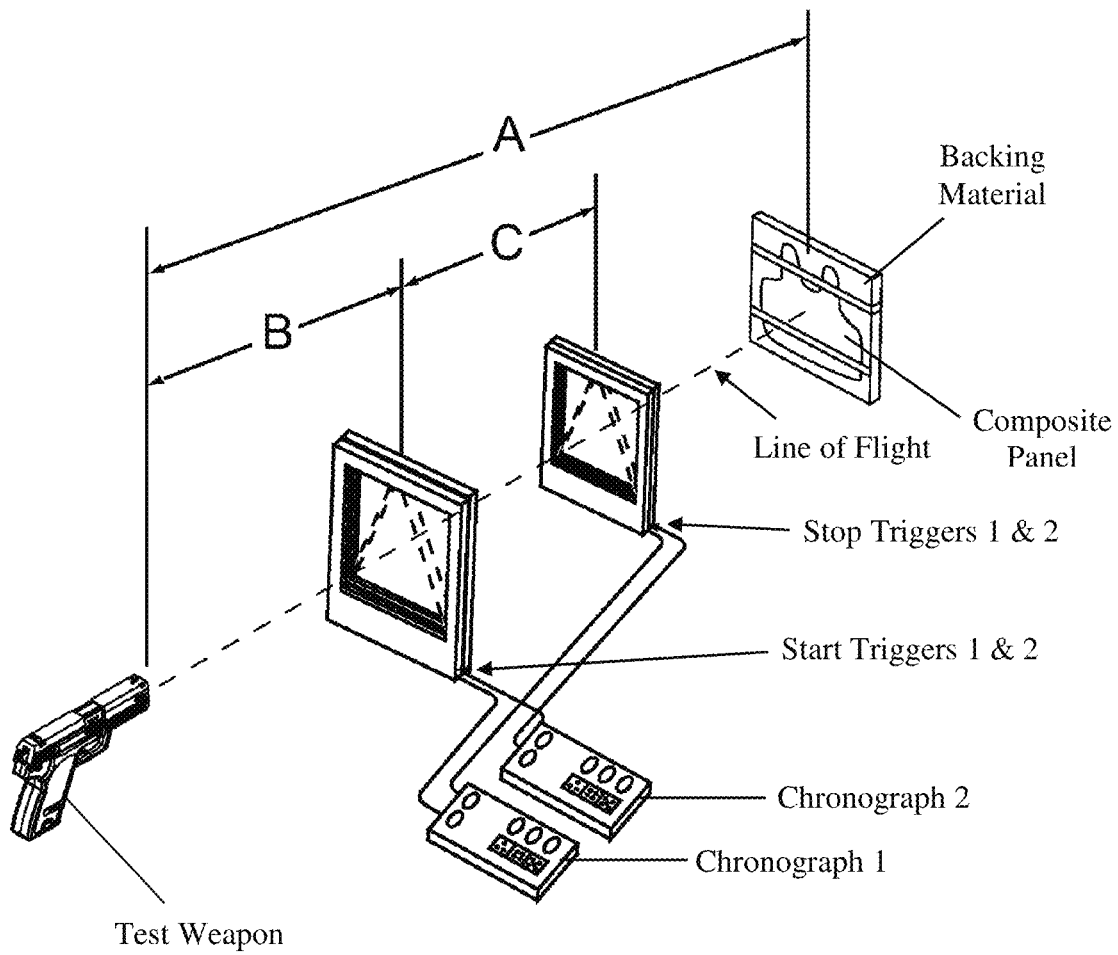
FIG. 1 illustrates a schematic representation of a backface signature testing set-up of the prior art as per NIH Standard 0101.06, wherein backface signature is tested by measuring the depth of deflection in a clay backing material.

Backface signature is a measure of the depth of deflection of either soft or hard armor into a backing material or into a user body due to a projectile impact. More specifically, backface deformation, also known in the art as "backface signature" ("BFS"), "trauma signature" or "blunt force trauma", is a measure of how much impact a projectile leaves under the armor once the armor stops the projectile from penetrating, indicating the potential blunt trauma experienced by the body underneath the armor. The standard method for measuring BFS of soft armor is outlined by NIJ Standard 0101.06, Type IIIA, which identifies a method of transferring the physical deformation of a composite resulting from a non-penetrating projectile impact into a deformable clay backing material held in an open face, box-like fixture. Per the NIJ standard, the armor being tested is secured directly to a front surface of the clay backing and any deformation of the clay resulting from standardized projectile firing conditions is identified and measured. Other methods may be used to measure BFS. The NIJ standard is conventionally used at the present time to evaluate soft armor composites intended for military use.

The terms "backface signature", "backface deformation", "trauma signature" and "blunt force trauma" have the same meaning in the art and are used interchangeably herein. For the purposes of this disclosure, articles that have superior ballistic penetration resistance describe those which exhibit excellent properties against deformable projectiles, such as bullets, and against penetration of fragments, such as shrapnel. A "fiber layer" as used herein may comprise a single-ply of unidirectionally oriented fibers, a plurality of non-consolidated plies of unidirectionally oriented fibers, a plurality of consolidated plies of unidirectionally oriented fibers, a woven fabric, a plurality of consolidated woven fabrics, or any other fabric structure that has been formed from a plurality of fibers, including felts, mats and other structures, such as those comprising randomly oriented fibers. A "layer" describes a generally planar arrangement. Each fiber layer will have both an outer top surface and an outer bottom surface. A "single-ply" of unidirectionally oriented fibers comprises an arrangement of non-overlapping fibers that are aligned in a unidirectional, substantially parallel array. This type of fiber arrangement is also known in the art as a "unitape", "unidirectional tape", "UD" or "UDT." As used herein, an "array" describes an orderly arrangement of fibers or yarns, which is exclusive of woven fabrics, and a "parallel array" describes an orderly parallel arrangement of fibers or yarns. The term "oriented" as used in the context of "oriented fibers" refers to the alignment of the fibers as opposed to stretching of the fibers. The term "fabric" describes structures that may include one or more fiber plies, with or without molding or consolidation of the plies. For example, a woven fabric or felt may comprise a single fiber ply. A non-woven fabric formed from unidirectional fibers typically comprises a plurality of fiber plies stacked on each other and consolidated. When used herein, a "single-layer" structure refers to any monolithic fibrous structure composed of one or more individual plies or individual layers that have been merged, i.e. consolidated by low pressure lamination or by high pressure molding, into a single unitary structure together with a polymeric binder material. By "consolidating" it is meant that the polymeric binder material together with each fiber ply is combined into a single unitary layer. Consolidation can occur via drying, cooling, heating, pressure or a combination thereof. Heat and/or pressure may not be necessary, as the fibers or fabric layers may just be glued together, as is the case in a wet lamination process. The term "composite" refers to combinations of fibers with at least one polymeric binder material. A "complex composite" as used herein refers to a consolidated combination of a plurality of fiber layers. As described herein, "non-woven" fabrics include all fabric structures that are not formed by weaving. For example, non-woven fabrics may comprise a plurality of unitapes that are at least partially coated with a polymeric binder material, stacked/overlapped and consolidated into a single-layer, monolithic element, as well as a felt or mat comprising non-parallel, randomly oriented fibers that are preferably coated with a polymeric binder composition.

For the purposes of the present disclosure, a "fiber" is an elongate body the length dimension of which is much greater than the transverse dimensions of width and thickness. The cross-sections of fibers for use herein may vary widely, and they may be circular, flat or oblong in cross-section. Thus the term "fiber" includes filaments, ribbons, strips and the like having regular or irregular cross-section, but it is preferred that the fibers have a substantially circular cross-section. As used herein, the term "yarn" is defined as a single strand consisting of multiple fibers. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber.

In the context of the present disclosure, the term "index of retraction" of a composite as used herein is a measure of the degree of retraction of a composite panel, at the location of an impact by a projectile, relative to its peak deflection resulting from the impact. In this regard, when a composite panel is impacted by a high energy projectile, such as a bullet, the projectile causes a deflection of the fabric layer(s) forming the panel whereby a depression is formed in the front surface of the panel and a corresponding rear protrusion is formed extending from the rear surface of the panel. In this regard, a "high energy" projectile simply refers to a projectile of any energy level that is sufficient to cause some measurable deflection in the panel, i.e., cause measurable backface deformation from the rear surface of the panel, and is not intended to be strictly limiting. As the panel works to stop the movement of the bullet, the deformation at the site of impact expands and the protrusion from the rear surface eventually reaches a peak distance from the original plane of the rear surface, and then it partially retracts. The peak deflection value is referred to herein as the "transient deflection distance" and the final deflection value after said partial retraction, when the panel is at rest, is referred to as the "permanent deflection distance." Each of the transient deflection distance and the permanent deflection distance are measured in units of length (e.g., mm) and the index of retraction is the percentage difference between these two values. It has been unexpectedly found that a material having a greater index of retraction is indicative of a material having a greater resistance to backface deformation, when composite panels are compared. Therefore, this method of evaluation provides an accurate representation of the backface signature of armor articles, such as helmets. In the preferred embodiments of this disclosure, the composites of this disclosure have an index of retraction of greater than 17%, more preferably about 18% or greater, still more preferably about 19% or greater, still more preferably about 20% or greater, still more preferably about 21% or greater, still more preferably about 22% or greater, and most preferably about 23% or greater.

In addition to the index of retraction, the degree of retraction can also be characterized in terms of the ratio of the transient (peak) deformation to the amount of retraction, each as measured in terms of distance. In this regard, in the preferred embodiments of this disclosure, the ratio of transient deformation to the amount of retraction for composites of this disclosure is less than 6.0:1, more preferably less than 5.5:1, still more preferably less than 5.0:1 and most preferably less than 4.5:1.

In each embodiment of the disclosure, the index of retraction values and aforementioned ratio values are determined for composite panels having a sufficient areal density to completely stop the projectile, i.e., they prevent the projectile from completely penetrating. In this regard, a non-penetrating projectile impact ensures the greatest accuracy in determining said values, and is also a requirement in the government standard testing method of NIJ 0101.06.

In order to determine each of the index of retraction as defined herein and the ratio of transient deformation to the amount of retraction with greatest accuracy, they should be determined by testing flat molded panels of the composites rather than shaped composite articles. In order to ensure that the composite panel is capable of stopping a high energy, high speed projectile, the composite panel should comprise a plurality of fiber plies that are consolidated together into a single unitary structure, as is defined above and described in greater detail below. Any suitable method may be used to fabricate the composites into flat panels. In the preferred embodiments, the flat panels are fabricated by first cutting a plurality of binder coated fiber plies (e.g., plies of coated, unidirectional non-woven fibers or binder coated woven fabrics) to have desired dimensions, followed by stacking a desired number of the plies onto each other surface-to-surface in a substantially coextensive fashion, followed by passing the stack through a flat-bed laminator (or equivalent) under the high pressure consolidation (i.e., molding) conditions described below. Suitable flat-bed laminators are well known in the art. Most preferred is a dual belt flat-bed laminator, such as one of the apparatuses described in commonly-owned U.S. Ser. No. 15/060,082, which is incorporated by reference herein to the extent consistent herewith.

Each flat molded panel as formed or as provided will be substantially planar and have a front surface and a rear surface. A projectile is fired at the front surface of said panel and impacts the panel at an impact site. The impact causes a deflection of the panel at the impact site, whereby a depression is formed in the front surface of the panel and a corresponding rear protrusion is formed extending from the rear surface of the panel. After the panel stops the movement of the projectile, the composite relaxes and the rear protrusion partially retracts. When the protrusion stops retracting, the panel is at rest and the final displacement of the panel may be measured from the plane of the un-deflected rear surface to the peak of the protrusion. This distance is identified as the permanent deflection, whereas the maximum distance of the protrusion from the plane of the rear surface prior to the beginning retraction is identified as the transient deflection. The distance difference between the transient deflection and the permanent deflection are then measured and used to calculate both the index of retraction and the ratio of the transient deformation to the total amount of retraction (i.e., the ratio of the transient deformation to the difference between permanent and transient deformation).

In order to allow for the collection of said deflection data, a protocol that is capable of accurately distinguishing the difference between permanent and transient deformation is required. Traditionally, deflection data has been measured by the method of NIJ Standard 0101.06, described above, where the armor sample is positioned directly on the surface of a clay backing material. The depth of deflection of the clay is then measured to determine BFS. An alternative method is described in commonly-owned U.S. patent application Ser. No. 13/594,757, now U.S. Pat. No. 9,222,864, which is incorporated herein by reference. In said method, the armor sample is positioned on a flat spacer having an interior cavity. The flat spacer is positioned on the backing medium, or directly adjacent to the backing medium, and the depth of the interior cavity is a known distance. A projectile is then fired at the armor sample at a location that corresponds to the interior of said cavity of the spacer, whereby all of or a majority of the deformation occurs within the cavity space between the sample and the backing medium.

Figure 3:
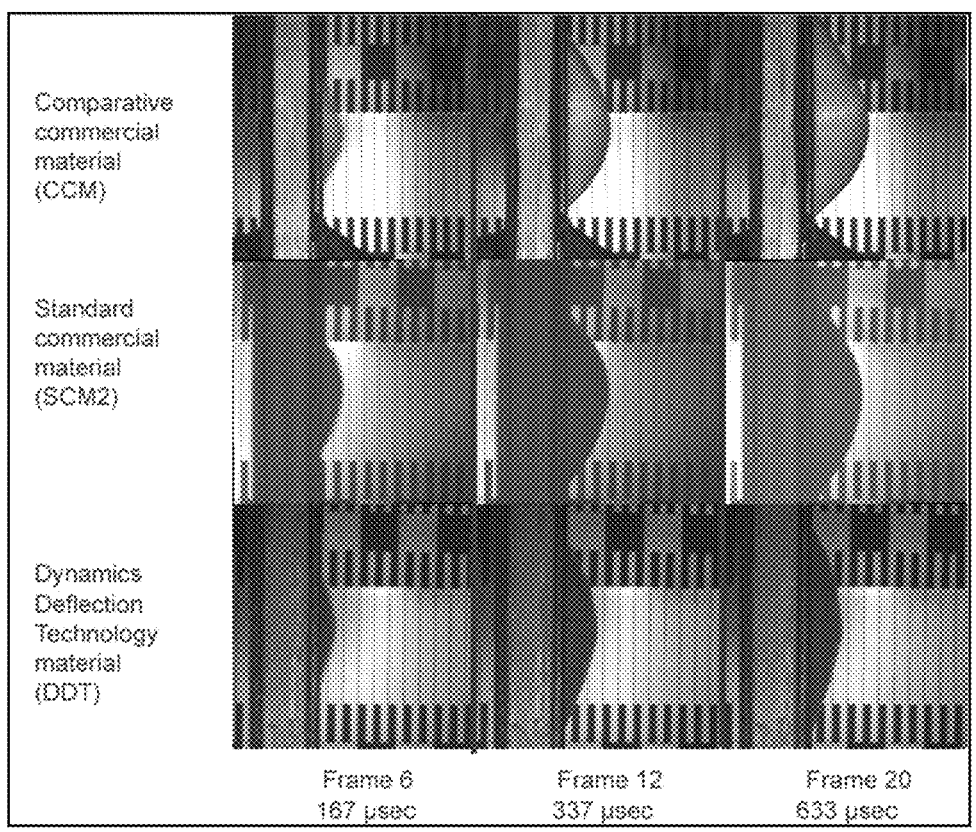
FIG. 3 illustrates the displacement of a composite panel of the present disclosure over time relative to two comparative composite panels.

In the present disclosure, a most preferred method is a variation of the method U.S. Ser. No. 13/594,757, but wherein there is no clay backing used at all. An example of a prior art projectile firing set-up is illustrated in FIG. 1, which illustrates an armor sample strapped to a backing material formed from a deformable medium, i.e. clay, allowing the extent of backface deformation to be measured. In the context of the present disclosure, the molded flat panel is firmly clamped or strapped to a support, such as a flat steel frame as described in U.S. Ser. No. 13/594,757, but with no backing material utilized. One or more high speed cameras are then used to record the interaction of the sample and the projectile from the moment of initial projectile impact until the end of composite retraction wherein the composite is at rest, preferably with a suitable calibrated pattern in the background as illustrated in FIG. 3. In this regard, any suitable camera may be used as would be readily determined by one skilled in the art. A particularly useful camera is FASTCAM-APX RS 250K, which is commercially available from Photron USA of San Diego, Calif. The video is then analyzed to measure the extent of transient and permanent deflection of the backface deformation of the composite. This data may then be used to determine values such as the retraction index and to compare multiple different composites.

Figure 2A:
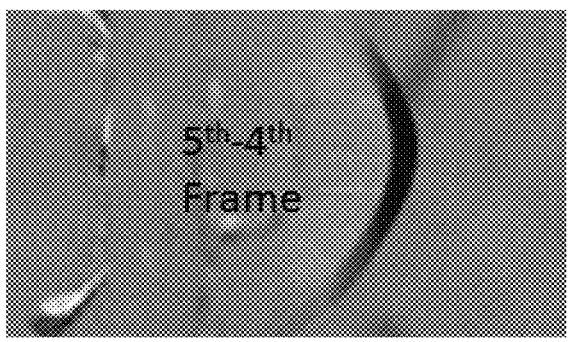
FIGS. 2A-2D illustrate the displacement of a composite panel over time from the moment of a projectile impact until the completion of composite retraction.
Figure 2B:
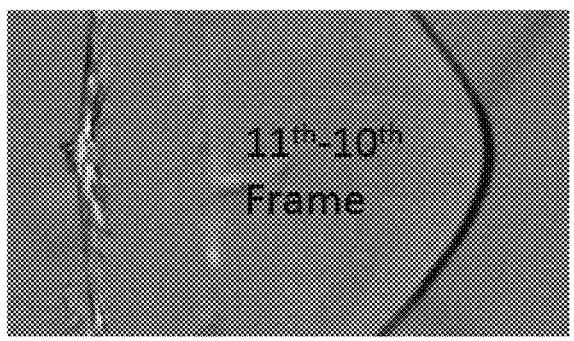
Figure 2C:
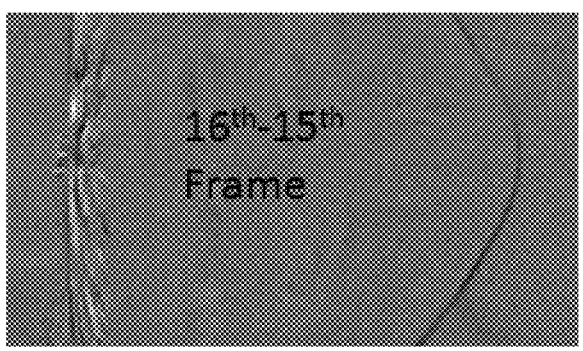
Figure 2D:
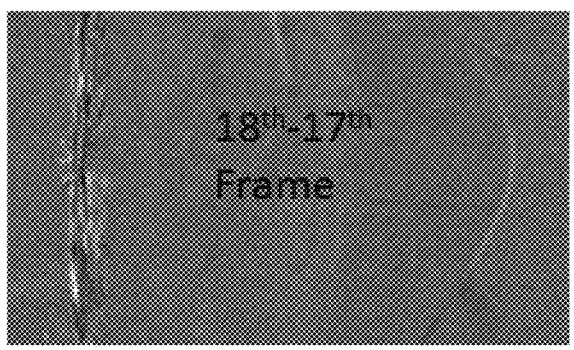

This method is illustrated in FIGS. 2A-2D, which show a series of four sequential images of a projectile impacting a composite panel, showing the displacement of the panel in time from the moment of impact to the moment of peak displacement and through the moment at which permanent deformation is reached. As seen in the figures, the changes in displacement over time is shown by subtracting from each video frame the frame before it. This produces a different image where displacement between of the backface envelope between frames is manifested as a dark band. The breadth of the dark band is a direct measurement of the positive (expanding) displacement. As seen in FIG. 2A, the difference between the $5^{th}$ frame and $4^{th}$ frame reveals a thick dark band compared to FIG. 2B which shows a smaller dark band between the $11^{th}$ and $10^{th}$ frames. An even thinner dark band is shown in FIG. 2C showing the difference between the $16^{th}$ and $15^{th}$ frames. Together these figures illustrate that the velocity of the expansion of deflection at the impact area slows down as it expands. The white band seen in FIG. 2D is an image of the difference between the 18th and 17th frames, illustrating that the back face envelope had started to contract from its maximum extension.

Figure 4:
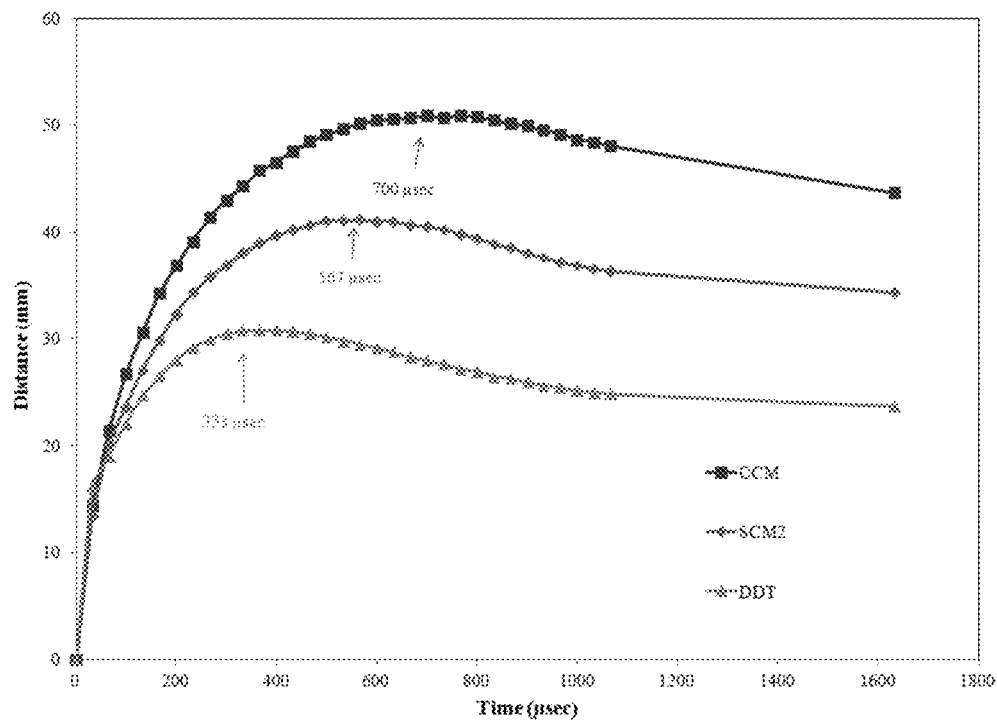
FIG. 4 is a plot of the velocity of the center of the backface protrusion for each of the three panels illustrated in FIG. 3.

As illustrated in FIG. 3, a set of captured video images were collected from three separate videos showing the backface deformation expansion of three different materials, namely, a comparative commercial material ("CCM"), a standard commercial material ("SCM") and a material of the present disclosure identified as "Dynamics Deflection Technology" material ("DDT"). Each composite panel was impacted with an 8.1 g, 7.62 mm×39 mm Lead Core bullet shot from an AK-47 at about 830±10 mps. These bullets are selected because they: a) carry high kinetic energy, b) generate high deformation and delamination on the molded panels, and c) are specified by law enforcement agencies and militaries. The three videos were collected using a high speed camera (a FASTCAM-APX RS 250K) recording at 30000 frames per second, with a calibrated pattern in the background and with appropriate lighting so that the bullet location and deflection of the panel could be recorded with minimal shadowing or other interference. The trigger was initiated when the bullet passed through the field using Oehler Model 57 infrared screens. In the figure, the 6th, 12th and 20th frames from high speed videos for three different materials are shown, and it is apparent that the CCM material has the largest expansion, while the Dynamics Deflection Technology (DDT) material had the least expansion upon projectile impact. FIG. 4 illustrates that the expansion of the backface protrusion is faster in the weaker panels shown in FIG. 3.

Figure 5:
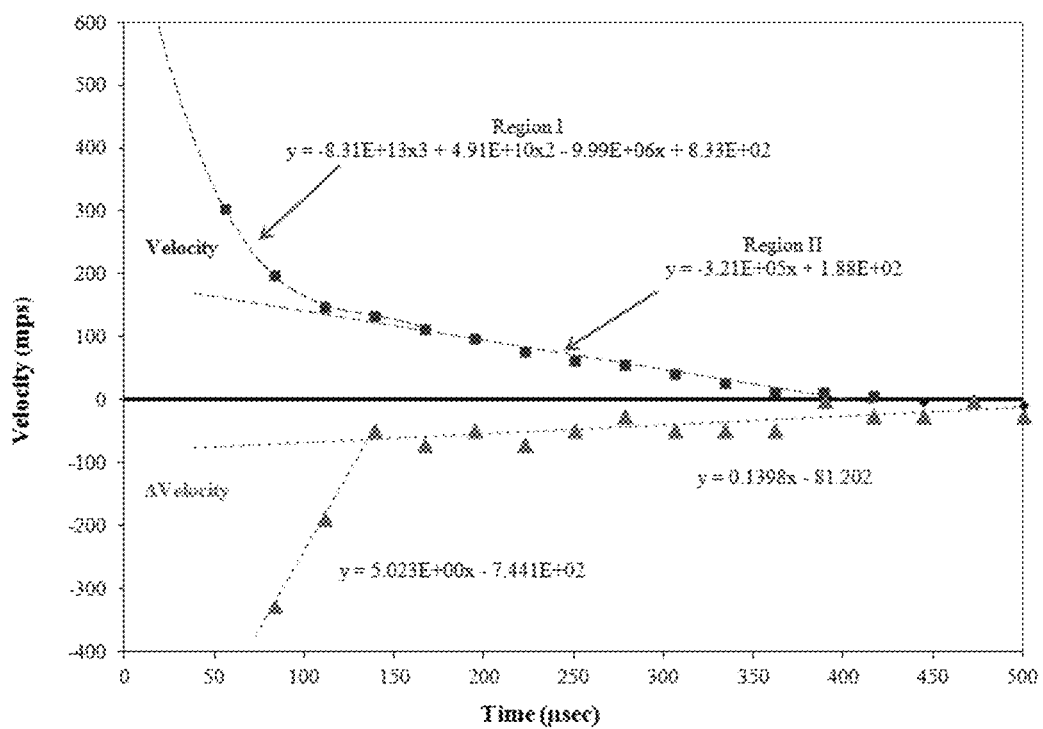
FIG. 5 is a graphical plot of the velocity of the backface expansion of a multi-ply a fibrous composite after it is impacted with a bullet, showing the development of two distinct expansion regions.

It has been found that materials having the greatest index of retraction are also the materials that have the smallest values in both transient and permanent deformation. It has further been found that panels having a lower ratio of transient deflection to contraction amount exhibit less delamination between the last ply of the multi-ply composite that has been penetrated by the projectile and the portion of unpenetrated rear plies. In other words, a lower ratio of, for example, 5:1, is better than a higher ratio of 6:1. The greater ratio values are indicative of a greater degree of delamination between the region of the composite where plies were penetrated and the region of the composite where plies were not penetrated, which is manifested by the formation of a cavity between the two regions. In this regard, the greater degree of delamination between the two regions (where region 1 is the penetrated portion of layers and region 2 is the unpenetrated portion of layers), as manifested in the larger ratio value, results from weaker bonding between the fibers and the polymeric binder coating (also referred to herein as a "resin" or "matrix") on the fibers. This difference in resin-fiber bond strength is further manifested by differences in the expansion velocity of these two regions as a projectile is stopped by the composite. Using displacement data and the video frame rate, the velocity of the back face expansion of a multi-ply composite can be calculated and plotted as shown in FIG. 5. In this graph, it is shown that there are at least two different velocity responses in the two regions: Region I showed a rapid decrease in velocity, fitted with a 3rd order polynomial, followed by Region II where the velocity decreased at a linear rate. The plot of the change in velocity clearly shows Region I decelerating at a steady non-linear rate, while in Region II the deceleration rate was very low and was almost constant. In other words, the materials having a lower ratio value do a better job of resisting deflection when stopping a projectile, which results not just from fibers and binder materials having superior tensile properties, but also the strength of the bond between fibers and the resin coating. The present disclosure accordingly provides methods for improving that bond as well as the overall composite ballistic resistance properties.

In the first instance, the strength of the resin-fiber bond is enhanced, at minimum, by partially removing a pre-existing fiber surface finish from the fibers prior to forming the fibers into a fabric. In this regard, forming a fabric includes the fabrication of woven fabric layers, non-woven fabric layers or a non-woven fiber plies. The removal of fiber surface finishes prior to the formation of non-woven fabric layers or non-woven fiber plies, or prior to the weaving of woven fabrics, is unique because the fiber surface finish is needed as a processing aid, as is described in greater detail in commonly-owned U.S. Ser. No. 13/594,735 (now U.S. Pat. No. 9,023,450), Ser. No. 13/594,747 (now U.S. Pat. No. 9,023,451) and Ser. No. 13/594,763 (now U.S. Pat. No. 9,023,452), all of which are incorporated by reference herein. For example, in the fabrication of non-woven fabrics, a fiber surface finish is generally required to reduce static build-up, prevent fiber tangling, lubricate the fiber to allow it to slide over loom components, and improve fiber cohesion during processing, including during fiber drawing steps.

While fiber surface finishes are typically needed during conventional fabric processing, they generally do not contribute to the final fabric properties. To the contrary, by covering fiber surfaces, the finish interferes with the ability of the fiber surfaces to contact each other, and interferes with the ability of the fiber surfaces to directly bond with coatings, such as liquid or solid resins, including polymeric binder materials that are applied onto the fibers. When such coatings are coated on top of the finish, rather than directly on the fiber surfaces, the bond is weaker than when the coating is directly on a cleaned (exposed) fiber surface, risking delamination during a ballistic impact. To enhance fiber-fiber friction and to permit direct bonding of resins/polymeric binder materials to the fiber surfaces, thereby increasing the fiber-coating bond strength, it is necessary that at least half of the existing fiber surface finish be removed from the fiber surfaces prior to the application of any coatings. As discussed below, there is a benefit to leaving some resin on the fiber surfaces, so for the purposes of this disclosure it is preferred that from greater than 50.0% to 99.0% of the finish is removed prior to applying any coatings, rather than 100% of the finish being removed.

The removal of the fiber surface finish is preferably accomplished by washing the fibers, preferably with only water and without using chemicals or organic solvents. The partial removal of the fiber surface finish will preferably begin once all fiber drawing/stretching steps have been completed. The step of washing the fibers or otherwise removing the fiber finish will remove enough of the fiber finish so that greater than 50.0% of the underlying fiber surface is exposed, up to 99.0% surface area exposure. Factors such as the composition of the washing agent (e.g., water or chemical wash), mechanical attributes of the washing technique (e.g., the force of the water contacting the fiber, agitation of a washing bath, etc.), will affect the amount of finish that is removed. In more preferred embodiments, at least about 75% to 99.0% of the finish is removed, more preferably at least about 80% to 99.0% of the finish is removed, still more preferably at least about 90% to 99.0% of the finish is removed, still more preferably at least about 95% to 99.0% of the finish is removed, and most preferably at least about 98% to 99.0% of the finish is removed, with each of these values also representing the percentage of exposed fiber surface area following the removal/washing process. In other embodiments, the percentage of exposed fiber surface area may range, for example, from greater than 50.0% up to 98.5%, or from greater than 50.0% up to 98.0%, from greater than 50.0% up to 97.5%, from greater than 50.0% up to 97.0%, from greater than 50.0% up to 96.5%, from greater than 50.0% up to 96.0%, from greater than 50.0% up to 95.5%, or from greater than 50.0% up to 95.0%. The remaining amount of fiber surface finish is referred to herein as a residue (residual fiber surface finish).

The amount of fiber surface finish removed in terms of finish surface area coverage, or in terms of exposed fiber surface area, may be measured by conventional surface metrology methods, including contact and non-contact methods, with non-contact methods being preferred herein. Non-contact methods use optical microscopes to image a surface and include interferometry, confocal microscopy, focus variation, structured light, electrical capacitance, electrical capacitance, electron microscopy and photogrammetry. The methods can be used to create 3-dimensional images of surface topography and measure surface area coverage of even a single filament/fiber.

The amount of residual finish may also be measured by weight. In this regard, any residual finish will be present in an amount of less than or equal to about 0.5% by weight based on the weight of the fiber plus the weight of the finish, preferably less than or equal to about 0.4% by weight, more preferably less than or equal to about 0.3% by weight, more preferably less than or equal to about 0.2% by weight and most preferably less than or equal to about 0.1% by weight based on the weight of the fiber plus the weight of the finish. The residual finish will exist as patches of finish rather than as a thinned continuous coating.

Following removal of the fiber surface finish, it is also preferred that the fibers are cleared of any removed finish particles so that the surface is clean of any debris prior to application of a polymeric binder material, resin or other adsorbate onto the exposed fiber surfaces.

Any conventionally known method for removing fiber surface finishes is useful within the context of the present disclosure, including both mechanical and chemical techniques means, but it is preferred that the fibers are washed only with water because chemicals may have an adverse effect of degrading the tensile properties of the fibers. In this regard, a fiber finish will typically comprise a combination of one or more lubricants, one or more non-ionic emulsifiers (surfactants), one or more anti-static agents, one or more wetting and cohesive agents, and one or more antimicrobial compounds. If the operator finds that portions of the finish are difficult to remove with only water, mechanical means may also be employed. For example, the efficiency of finish removal using de-ionized water may be enhanced by manipulating the force, direction, velocity, etc. of the water application process.

In the preferred embodiments, the fibers are washed and/or rinsed with water as a fiber web, preferably using de-ionized water, with optional drying of the fibers after washing, without using any other chemicals. In other embodiments where the finish is not water soluble, the finish may be removed or washed off with, for example, an abrasive cleaner, chemical cleaner or enzyme cleaner. See, for example, U.S. Pat. Nos. 5,573,850 and 5,601,775, which are incorporated herein by reference, which teach a conventionally known chemical means for removing a surface finish. Other useful chemical agents non-exclusively include alcohols, such as methanol, ethanol and 2-propanol; aliphatic and aromatic hydrocarbons such as cyclohexane and toluene; chlorinated solvents such as di-chloromethane and tri-chloromethane. Washing the fibers will also remove any other surface contaminants, allowing for more intimate contact between the fiber and resin or other coating material.

The preferred means used to clean the fibers with water is not intended to be strictly limiting except requiring that the method used must be capable of remove sufficient finish to expose greater than 50.0% of the fiber surface area. In a preferred method, removal of the finish is accomplished by a process that comprises passing a fiber web through pressurized water nozzles to wash (or rinse) and/or physically remove the finish from the fibers. The fibers may optionally be pre-soaked in a water bath before passing the fibers through said pressurized water nozzles, and/or soaked after passing the fibers through the pressurized water nozzles, and may also optionally be rinsed after any of said optional soaking steps by passing the fibers through additional pressurized water nozzles. The washed/soaked/rinsed fibers are preferably also dried after washing/soaking/rinsing is completed. The equipment and means used for washing the fibers is not intended to be limiting, except that it must be capable of washing individual multifilament fibers/multifilament yarns rather than fabrics, i.e. before they are woven or formed into non-woven fiber layers/plies.

The removal of the fiber surface finish prior to fabric formation is especially intended herein for the production of non-woven fabrics that are formed by consolidating a plurality of fiber plies that comprise a plurality of unidirectionally aligned fibers. In a typical process for forming non-woven unidirectionally aligned fiber plies, fiber bundles are supplied from a creel and led through guides and one or more spreader bars into a collimating comb, followed by coating the fibers with a polymeric binder material. Alternately the fibers can be coated before encountering the spreader bars, or they may be coated between two sets of spreader bars, one before and one after the coating section. A typical fiber bundle (e.g. a yarn) will have from about 30 to about 2000 individual filaments, each fiber typically including, but not limited to, from about 120 to about 240 individual filaments. The spreader bars and collimating comb disperse and spread out the bundled fibers, reorganizing them side-by-side in a coplanar fashion. Ideal fiber spreading results in the individual fibers, or even individual filaments, being positioned next to one another in a single fiber plane, forming a substantially unidirectional, parallel array of fibers with a minimal amount of fibers overlapping each other. Removing the fiber surface finish before or during this spreading step may enhance and accelerate the spreading of the fibers into such a parallel array due to the physical interaction of the cleaning agent (e.g. water) with which the fibers/filaments interact. Following fiber spreading and collimating, the fibers of such a parallel array will typically contain from about 3 to 12 fiber ends per inch (1.2 to 4.7 ends per cm), depending on the fiber thickness. Accordingly, removal of the fiber surface finish achieves a dual benefit of enhancing fiber spreading and improves the bond strength of subsequently applied materials/adsorbates on the fiber surfaces.

While removal of the fiber surface finish alone achieves the aforementioned benefits, even greater results may be achieved by conducting bond enhancing treatments on the fiber surfaces after the partial finish removal. In particular, it has been found that backface deformation reduction is directly proportional to increases in fiber-fiber friction and fiber-coating bond strength. Treating or modifying the fiber surfaces with a bond enhancing treatment prior to fabric formation has been found to achieve even greater improvements in composite backface signature reduction, particularly when the bond enhancing treatment is combined with washing the fibers to partially remove the fiber finish. This is particularly evident when a coating such as a polymeric binder material or resin is applied onto the fiber surfaces, such as a polymeric binder material or resin that is conventionally used for fabrication of non-woven fabrics, or which is applied after weaving fabrics and partially removing a fiber surface finish. The stronger the bond of the coating (e.g. polymer/resin) to the fiber surface, the greater the reduction in backface signature. Accordingly, in the most preferred embodiments of this disclosure, after the partial removal of the fiber surface finish, but prior to fabric formation, it is particularly desired to conduct a treatment of the fiber surfaces under conditions effective to enhance the adsorbability/bonding of a subsequently applied coating (e.g. polymer/resin) on the fiber surfaces. By virtue of the initial removal of the fiber finish, these additional processes are allowed to act directly on the exposed surface of the fiber and not on top of the fiber surface finish or on top of surface contaminants. This is most desired because surface finishes tend to interfere with attempts to treat the surface of the fiber, acting as a barrier or contaminant. Removal of the finish thus also improves the quality and uniformity of subsequent fiber surface treatments. The benefits of finish removal and such further treatments are cumulative, and improvements in backface signature performance should increase with an increased percentage of finish removal and with greater effectiveness of the treatments. However, when these treatments are performed directly on naked fiber surfaces, they have the potential to degrade the tensile properties of the fiber. In this regard, the presence of some residual finish will help minimize any such loss to the tensile properties while balancing those protected properties with the benefits of surface energy enhancement.

To this end, useful treatments or modifications include anything that is effective to enhance the adsorbability of a subsequently applied adsorbate on the fiber surfaces, where an adsorbate may be any solid, liquid or gas, including polymeric binder materials and resins, and where adsorption includes any form of bonding of the materials to the fiber surfaces. There are various means by which this may be accomplished, including treatments that roughen the surface, add polarity to the surface, oxidize the fiber surface or fiber surface moieties, increase the surface energy of the fiber, reduce the contact angle of the fiber, increase wettability of the fiber, modify the crosslink density of the fiber surface, add a chemical functionality to the fiber surface, ablate the surface, or any other means of improving the interaction between the bulk fiber and fiber surface coatings to improve the anchorage of the coatings to fiber surfaces. This modified interaction can easily be seen in improvements in BFS.

Suitable fiber surface treatments or surface modifications include processes that may be known in the art, such as corona treating the fibers, plasma treating the fibers, plasma coating the fibers, direct fluorination of the fiber surfaces with elemental fluorine, a chemical treatment such as chemical UV grafting, or a surface roughening treatment, such as chromic etching. Also suitable are treatments that are yet undeveloped for large scale application that enhance the ability of an adsorbate to adsorb on or any material to bond with the exposed and treated fiber surfaces following removal fiber surface finish but prior to fabric formation. Each of these exemplary processes, through their action on the surface of the fiber, can be employed to modify, improve or reduce the interaction between the bulk fiber and subsequent coating materials, depending on fiber chemistry. Any combination of these processes can be employed and these sub-processes can be placed in different sequences, although there may be some sequences that are preferred over others depending on various factors, such as fiber type or natural fiber surface properties. The various treatment steps of this disclosure may be utilized as a recipe for manipulating the fibers in order to place the composite within the desired ranges for the index of retraction and the transient deformation:total retraction ratio, as described above.

The most preferred treatments are corona treatment of the fiber surfaces and plasma treatment of the fiber surfaces. Corona treatment is a process in which a fiber is passed through a corona discharge station, thereby passing the fiber web through a series of high voltage electric discharges, which tend to act on the surface of the fiber web in a variety of ways, including pitting, roughing and introducing polar functional groups by way of partially oxidizing the surface of the fiber. Corona treatment typically oxidizes the fiber surface and/or adds polarity to the fiber surface. Corona treatment also acts by burning small pits or holes into the surface of the fiber. When the fibers are oxidizable, the extent of oxidation is dependent on factors such as power, voltage and frequency of the corona treatment. Residence time within the corona discharge field is also a factor, and this can be manipulated by corona treater design or by the line speed of the process. Suitable corona treatment units are available, for example, from Enercon Industries Corp., Menomonee Falls, Wis., from Sherman Treaters Ltd, Thame, Oxon., UK, or from Softal Corona & Plasma GmbH & Co of Hamburg, Germany.

In a preferred embodiment, the fibers are subjected to a corona treatment energy per unit area per unit time, referred to herein as the energy flux, of from about 2 Watts/ft$^2$/MIN to about 100 Watts/ft$^2$/MIN, more preferably from about 20 Watts/ft$^2$/MIN to about 50 Watts/ft$^2$/MIN. Lower energy corona treatments from about 1 Watts/ft$^2$/MIN to about 5 Watts/ft$^2$/MIN are also useful may be less effective. In addition to applying a charge to the fiber surface, a corona treatment may roughen the surface by pitting the surface of the fiber.

In a plasma treatment, the fibers, typically as a fiber web, are passed through an ionized atmosphere in a chamber that is filled with an inert or non-inert gas, such as oxygen, argon, helium, ammonia, or another appropriate inert or non-inert gas, including combinations of the above gases, to thereby contact the fibers with an electric discharge. At the fiber surfaces, collisions of the surfaces with charged particles (ions) result in both the transfer of kinetic energy and the exchange of electrons, etc. In addition, collisions between the surfaces and free radicals will result in similar chemical rearrangements. Bombardment of the fiber surface by ultraviolet light that is emitted by excited atoms and molecules relaxing to lower states also causes chemical changes to the fiber substrate.

As a result of these interactions, the plasma treatment may modify both the chemical structure of the fiber as well as the topography of the fiber surfaces. For example, like corona treatment, a plasma treatment may also add polarity to the fiber surface and/or oxidize fiber surface moieties. Plasma treatment may also serve to increase the surface energy of the fiber, reduce the contact angle, modify the crosslink density of the fiber surface, increase the melting point and the mass anchorage of subsequent coatings, and may add a chemical functionality to the fiber surface and potentially ablate the fiber surface. These effects are likewise dependent on the fiber chemistry, and are also dependent on the type of plasma employed.

The selection of gas is important for the desired surface treatment because the chemical structure of the surface is modified differently using different plasma gases. Such would be determined by one skilled in the art. It is known, for example, that amine functionalities may be introduced to a fiber surface using ammonia plasma, while carboxyl and hydroxyl groups may be introduced by using oxygen plasma. Accordingly, the reactive atmosphere may comprise one or more of argon, helium, oxygen, nitrogen, ammonia, and/or other gas known to be suitable for plasma treating of fabrics. The reactive atmosphere may comprise one or more of these gases in atomic, ionic, molecular or free radical form. For example, in a preferred continuous process of this disclosure, an array of fibers is passed through a controlled reactive atmosphere that preferably comprises argon atoms, oxygen molecules, argon ions, oxygen ions, oxygen free radicals, as well as other trace species. In a preferred embodiment, the reactive atmosphere comprises both argon and oxygen at concentrations of from about 90% to about 95% argon and from about 5% to about 10% oxygen, with 90/10 or 95/5 concentrations of argon/oxygen being preferred. In another preferred embodiment, the reactive atmosphere comprises both helium and oxygen at concentrations of from about 90% to about 95% helium and from about 5% to about 10% oxygen, with 90/10 or 95/5 concentrations of helium/oxygen being preferred. Another useful reactive atmosphere is a zero gas atmosphere, i.e. room air comprising about 79% nitrogen, about 20% oxygen and small amounts of other gases, which is also useful for corona treatment to some extent.

Plasma treating may be conducted in a vacuum chamber or in a chamber maintained at atmospheric conditions. A plasma treatment differs from a corona treatment mainly in that a plasma treatment is conducted in a controlled, reactive atmosphere of gases, whereas in corona treatment the reactive atmosphere is air. The atmosphere in the plasma treater can be easily controlled and maintained, allowing surface polarity to be achieved in a more controllable and flexible manner than corona treating. The electric discharge is by radio frequency (RF) energy which dissociates the gas into electrons, ions, free radicals and metastable products. Electrons and free radicals created in the plasma collide with the fiber surface, rupturing covalent bonds and creating free radicals on the fiber surface. In a batch process, after a predetermined reaction time or temperature, the process gas and RF energy are turned off and the leftover gases and other byproducts are removed. In a continuous process, which is preferred herein, an array of fibers is passed through a controlled reactive atmosphere comprising atoms, molecules, ions and/or free radicals of the selected reactive gases, as well as other trace species. The reactive atmosphere is constantly generated and replenished, likely reaching a steady state composition, and is not turned off or quenched until the coating machine is stopped.

Plasma treatment may be carried out using any useful commercially available plasma treating machine, such as plasma treating machines available from Softal Corona & Plasma GmbH & Co of Hamburg, Germany; 4$^{th}$ State, Inc. of Belmont Calif.; Plasmatreat US LP of Elgin Ill.; Enercon Surface Treating Systems of Milwaukee, Wis. A preferred plasma treating process is conducted at about atmospheric pressure, i.e. 1 atm (760 mm Hg (760 torr)), with a chamber temperature of about room temperature (70° F.-72° F.). The temperature inside the plasma chamber may potentially change due to the treating process, but the temperature is generally not independently cooled or heated during treatments, and it is not believed to affect the treatment of the fibers as they rapidly pass through the plasma treater. The temperature between the plasma electrodes and the fiber web is typically approximately 100° C. The plasma treating process is preferably conducted under RF power at about 0.5 kW to about 3.5 kW, more preferably from about 1.0 kW to about 3.05 kW, and most preferably plasma treating is conducted using an atmospheric plasma treater set at 2.0 kW. This power is distributed over the width of the plasma treating zone (or the length of the electrodes) and this power is also distributed over the length of the substrate or fiber web at a rate that is inversely proportional to the line speed at which the fiber web passes through the reactive atmosphere of the plasma treater. This energy per unit area per unit time (watts per square foot per minute or W/SQFT/MIN), i.e., energy flux, is a useful way to compare treatment levels. Effective values for plasma treatment energy flux are preferably from about 0.5 to about 200 Watts/SQFT/MIN, more preferably from about 1 to about 100 Watts/SQFT/MIN, even more preferably from about 1 to about 80 Watts/SQFT/MIN and most preferably from about 2 to about 40 Watts/SQFT/MIN. The total gas flow rate is approximately 16 liters/min, but this is not intended to be strictly limiting. The plasma treatment time (or residence time) of the fiber is approximately 2 seconds, although this is relative to the dimensions of the plasma treater employed and is not intended to be strictly limiting. A more appropriate measure is the amount of plasma treatment in terms of RF power applied to the fiber per unit area over time.

Plasma coating is defined as activating the surface of the fiber web and passing the activated fiber web through an atmosphere containing vinyl monomers, vinyl oligomers or some other reactive species. Plasma coating can add very specific chemical functionality to the surface of the fiber, and can add a different polymeric character to the surface of the fiber. In a direct fluorination treatment, the fiber surfaces are modified by direct fluorination of the fibers with elemental fluorine. For example, the fiber surfaces may be fluorinated by contacting the fiber surfaces with a mixture of 10% $F_2$/90% He at 25° C. to deposit elemental fluorine on said surfaces. The elemental fluorine present on the fiber surfaces serve as functional groups for bonding with subsequently applied coating materials. See also, for example, U.S. Pat. Nos. 3,988,491 and 4,020,223, which are incorporated herein by reference, which teach direct fluorination of fibers using a mixture of elemental fluorine, elemental oxygen and a carrier gas. UV grafting is also a well-known process in the art. In an optional process of UV grafting of a ballistic fiber surface, the fibers (or fabric) are soaked in a solution of a monomer, photosensitizer and a solvent to at least partially coat the fiber/fabric surfaces with the monomer and photosensitizer. The coated fibers are then irradiated with UV irradiation, as is well known in the art. The particular selection of monomer type, photosensitizer type and solvent type will vary as desired by and readily determined by one skilled in the art. For example, acrylamide groups may be grafted onto UHMWPE polymer chains via an acrylamide grafting monomer, as discussed in the article entitled, "Studies on surface modification of UHMWPE fibers via UV initiated grafting" by Jieliang Wang, et al. of the Department of Applied Chemistry, School of Science, Northwestern Polytechnical University, Xi'an, Shaanxi 710072, PR China.

Applied Surface Science, Volume 253, Issue 2, 15 Nov. 2006, pages 668-673, the disclosure of which is incorporated herein by reference to the extent consistent herein.

Additionally, the fibers of this disclosure may be treated with one or more than one of these of optional treatments. For example, the fibers may be both roughened by chromic etching and plasma treated, or both corona treated and plasma coated, or both plasma treated and plasma coated. Additionally, composites and fabrics of this disclosure may comprise some fibers that are treated and some fibers that are not treated. For example, composites herein may be fabricated from some fibers that are corona treated and some fibers that are plasma treated, or some fibers that are fluorinated and some fibers that are not fluorinated.

Each of these treatments will be conducted after the partial removal of the fiber surface finish but prior to the application of any binder/matrix resins or other surface adsorbates/coatings. Treating the exposed fiber surfaces immediately before coating the aligned fiber web with a polymeric binder material or resin is most preferred because it will cause the least disruption to the fiber manufacturing process and will leave the fiber in a modified and unprotected state for the shortest period of time. It is ideal to remove the fiber surface finish and treat the exposed fiber surfaces immediately after unwinding fibers from a fiber spool (wound fiber package) and aligning the fibers into a fiber web, followed by immediately coating or impregnating the fibers with a polymer/resin coating. This will also leave the fibers in a treated and uncoated state for the shortest length of time should there be considerations about the shelf-life or decay rate of the surface modification of the fiber.

Fibrous composites treated as described above (washed and treated) having said retraction behavior within the above-described values have been found to exhibit significant lower backface signature relative to composites having inferior retraction behavior. This is particularly evident when the component fibers are polyethylene fibers, which are naturally superior than other fibers in their ballistic resistance abilities but have a lower natural affinity for polymer coatings. Treating the surfaces of polyethylene fibers with any combination of the treatments as described above, prior to the fabrication of polyethylene-based fabrics formed therefrom, achieves a combination of structural properties, ballistic penetration resistance and backface signature resistance properties that are comparatively superior to any other fiber type, including aramid fibers.

In this regard, the fibrous composites of this disclosure have a preferred backface signature of less than about 8 mm as measured for a composite having an areal density of 2.0 psf when impacted with a 124-grain, 9 mm FMJ RN projectile fired at a velocity of from about 427 m/s to about 445 m/s (1430 feet/second (fps)±30 fps). This is not to say that all fibrous composites or articles of this disclosure will have an areal density of 2.0 psf, nor that all fibrous composites or articles of this disclosure will have a BFS of 8 mm against such an FMJ RN projectile at said velocity. Such only identifies that composites fabricated according to the processes of this disclosure are characterized in that when fabricated into a 2.0 psf panel, that 2.0 psf panel will have a BFS of less than about 8 mm against such an FMJ RN projectile at said velocity. In the preferred embodiments of this disclosure, the fibrous composites of this disclosure have a more preferred backface signature of less than about 7 mm when impacted with a 124-grain, 9 mm FMJ projectile fired at a velocity of from about 427 m/s to about 445 m/s under the projectile firing conditions of NIJ Standard 0101.06, more preferably less than about 6 mm, more preferably less than about 5 mm, more preferably less than about 4 mm, more preferably less than about 3 mm, more preferably less than about 2 mm, and most preferably have a backface signature of less than about 1 mm when impacted with a 124-grain, 9 mm FMJ RN projectile (a bullet comprising approximately 90% copper and 10% zinc excluding the base) fired at a velocity of from about 427 m/s to about 445 m/s. Testing BFS against a 124-grain, 9 mm FMJ RN projectile fired at a velocity of from about 427 m/s to about 445 m/s is common in the art.

Said fibrous composites achieving these BFS values each comprise a plurality of adjoined fiber layers, each fiber layer comprising fibers having surfaces that are at least partially covered with a polymeric material, wherein said fibers are from greater than 50.0%-99.0% free of a fiber surface finish (measured by percent of exposed fiber surface area) such that said polymeric material is predominantly in direct contact with the fiber surfaces and not predominantly on top of the finish.

Said fibrous composites achieving both these BFS values and the recited retraction properties also preferably exhibit a $V_{50}$ against a 17-grain fragment simulating projectile (FSP) of at least about 1750 feet/sec (fps) (533.40 m/s), more preferably at least about 1800 fps (548.64 m/s), even more preferably at least about 1850 fps (563.88 m/s) and most preferably at least about 1900 fps (579.12 m/s). All of the above $V_{50}$ values are for armor panels having a composite areal density of approximately 1.0 lbs/ft$^2$ (psf)(4.88 kg/m$^2$ (ksm)). All of the above BFS values are for armor panels having a composite areal density of approximately 2.0 lbs/ft$^2$ (psf)(7.96 kg/m$^2$ (ksm)). As with BFS, this is not to say that all fibrous composites or articles of this disclosure will have a particular areal density, nor that all fibrous composites or articles of the disclosure will have a $V_{50}$ against a 17-grain FSP of at least about 1750 feet/sec. Such only identifies that composites fabricated according to the processes of this disclosure are characterized in that when fabricated into a 1.0 psf panel, that 1.0 psf panel will have a $V_{50}$ against a 17-grain FSP of at least about 1750 feet/sec. The methods used for $V_{50}$ testing are conventionally known in the art.

The fiber layers and composites formed herein are preferably ballistic resistant composites formed from high-strength, high tensile modulus viscoelastic polymeric fibers. Most preferably, the fibers comprise high strength, high tensile modulus viscoelastic fibers which are useful for the formation of ballistic resistant materials and articles. As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each both as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

The polymers forming the fibers are preferably high-strength, high tensile modulus fibers suitable for the manufacture of ballistic resistant composites/fabrics. Particularly suitable high-strength, high tensile modulus viscoelastic fiber materials that are particularly suitable for the formation of ballistic resistant composites and articles include polyolefin fibers, including high density and low density polyethylene. Particularly preferred are extended chain polyolefin fibers, such as highly oriented, high molecular weight polyethylene fibers, particularly ultra-high molecular weight polyethylene fibers, and polypropylene fibers, particularly ultra-high molecular weight polypropylene fibers. Also suitable are viscoelastic polyamide fibers, polyethylene terephthalate fibers, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, and viscoelastic liquid crystal copolyester fibers. Non-viscoelastic fibers such as aramid fibers, glass fibers, carbon fibers and non-viscoelastic rigid rod fibers such as M5® fibers (formed from pyridobisimidazole-2,6-diyl (2,5-dihydroxy-p-phenylene; manufactured by Magellan Systems International of Richmond, Va.; described in U.S. Pat. Nos. 5,674,969, 5,939,553, 5,945,537, and 6,040,478) may also be useful but may not meet the retractive performance desired herein. All of the above fiber types are conventionally known in the art. Also suitable for producing viscoelastic polymeric fibers are viscoelastic copolymers, viscoelastic block polymers and blends of the above materials. Also suitable are combinations of all the above materials, all of which are commercially available. The most preferred fiber types for use herein are viscoelastic polyethylene fibers, most preferably ultra-high molecular weight polyethylene fibers.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. Nos. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A particularly preferred fiber type for use in this disclosure are polyethylene fibers sold under the trademark SPECTRA® from Honeywell International Inc. SPECTRA® fibers are well known in the art and are described, for example, in U.S. Pat. Nos. 4,623,547 and 4,748,064. In addition to polyethylene, another useful polyolefin fiber type is polypropylene (fibers or tapes), such as TEGRIS® fibers commercially available from Milliken & Company of Spartanburg, S.C.

Suitable polybenzazole fibers for the practice of this disclosure are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers for the practice of this disclosure are commercially available and are disclosed, for example, in U.S. Pat. Nos. 3,975,487; 4,118,372 and 4,161,470, each of which is incorporated herein by reference. Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available.

The fibers may be of any suitable denier, such as, for example, 50 to about 3000 denier, more preferably from about 200 to 3000 denier, still more preferably from about 650 to about 2000 denier, and most preferably from about 800 to about 1500 denier. The selection is governed by considerations of ballistic effectiveness and cost. Finer fibers are more costly to manufacture and to weave, but can produce greater ballistic effectiveness per unit weight.

As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiments of the disclosure, the tenacity of the fibers should be about 15 g/denier or more, preferably about 20 g/denier or more, more preferably about 25 g/denier, still more preferably about 27 g/denier or more, and still more preferably about 30 g/denier or more. In more preferred embodiments, the fibers have a tenacity of at least 35 g/denier, still more preferably about 37 g/denier or more, still more preferably about 40 g/denier or more, still more preferably about 45 g/denier or more, still more preferably about 50 g/denier or more, still more preferably about 55 g/denier or more, and most preferably about 60 g/denier or more. Preferred fibers also have a preferred tensile modulus of about 300 g/denier or more, more preferably about 400 g/denier or more, more preferably about 500 g/denier or more, more preferably about 1,000 g/denier or more and most preferably about 1,500 g/denier or more. Preferred fibers also have a preferred energy-to-break of about 15 J/g or more, more preferably about 25 J/g or more, more preferably about 30 J/g or more and most preferably have an energy-to-break of about 40 J/g or more. These combined high strength properties are obtainable by employing well known processes. U.S. Pat. Nos. 4,413,110; 4,440,711; 4,535,027; 4,457,985; 4,623,547; 4,650,710; 4,748,064; 7,638,191; 7,736,561; 7,846,363; 8,361,366; 8,444,898 and 8,747,715 generally discuss the formation of preferred high strength, extended chain polyethylene fibers. Such methods, including solution grown or gel fiber processes, are well known in the art. Methods of forming each of the other preferred fiber types, including para-aramid fibers, are also conventionally known in the art, and the fibers are commercially available. The fibrous composites of the disclosure also preferably comprise fibers having a fiber areal density of about 1.7 g/cm³ or less.

After removing a portion of the fiber surface finish from the fiber surfaces as desired, and after the fiber surfaces are optionally treated under conditions effective to enhance the adsorbability of a subsequently applied adsorbate on the fiber surfaces, an adsorbate is then optionally applied onto at least a portion of at least some of the fibers. As used herein, the term "adsorption" (or "adsorbability" or "adsorb") is broadly intended to encompass both physisorption and chemisorption of any material (solid, liquid, gas or plasma) on the fiber surface, where "physisorption" is defined herein as physical bonding of a material on a fiber surface and "chemisorption" is defined herein as chemical bonding of a material on a fiber surface, where a chemical reaction occurs at the exposed fiber (i.e. the adsorbent) surface. The term "adsorption" as used herein is intended to include any possible means of attaching, adhering or bonding a material to a substrate surface, physically or chemically, without limitation, including means for increasing fiber wetting/adhesion of fibers in polymer matrices. This expressly includes the adhesion or coating of any solid, liquid or gas material on the fiber surfaces, including any monomer, oligomer, polymer or resin, and including the application of any organic material or inorganic material onto the fiber surfaces. In this regard, the definition of "adsorbate" is also not intended to be limiting and expressly includes all polymers useful as polymer binder materials, resins or polymeric matrix materials. However, for the purposes of this disclosure, the class of useful adsorbates expressly excludes materials that do not have binding properties, including fiber surface finish substances such as a spin finish materials, which are not binder materials having binding properties and which, to the contrary, are specifically removed from fiber surfaces according to this disclosure.

For the purposes of this disclosure, the application of an adsorbate that is a viscoelastic polymer binder material, such as a resin, is required to achieve a composite having the desired retraction properties (i.e., said index of retraction and the transient deformation:total retraction ratio). Accordingly, the fibers forming the woven or non-woven fabrics of this disclosure are coated with or impregnated with a polymeric binder material. The polymeric binder material either partially or substantially coats the individual fibers of the fiber layers, preferably substantially coating each of the individual fibers of each fiber layer. The polymeric binder material is also commonly known in the art as a "polymeric matrix" material, and these terms are used interchangeably herein. These terms are conventionally known in the art and describe a material that binds fibers together either by way of its inherent adhesive characteristics or after being subjected to well-known heat and/or pressure conditions. Such a "polymeric matrix" or "polymeric binder" material may also provide a fabric with other desirable properties, such as abrasion resistance and resistance to deleterious environmental conditions, so it may be desirable to coat the fibers with such a binder material even when its binding properties are not important, such as with woven fabrics.

Suitable viscoelastic polymeric binder materials include both low tensile modulus, thermoplastic elastomer materials and high tensile modulus, rigid thermoplastic materials. As used herein throughout, the term tensile modulus means the modulus of elasticity as measured by ASTM 2256 for a fiber and by ASTM D638 for a polymeric binder material. A low or high modulus binder may comprise a variety of polymeric and non-polymeric materials. For the purposes of this disclosure, a low modulus thermoplastic, elastomeric material has a tensile modulus measured at about 6,000 psi (41.4 MPa) or less according to ASTM D638 testing procedures. Typical low modulus thermoplastic elastomers have a tensile modulus of about 4,000 psi (27.6 MPa) or less, about 2400 psi (16.5 MPa) or less, about 1200 psi (8.23 MPa) or less, or even about 500 psi (3.45 MPa) or less. The glass transition temperature (Tg) of the elastomer is typically less than about 0° C., or less than about −40° C., or less than about −50° C. Low modulus elastomers may have an elongation-to-break of at least about 50%, at least about 100%, or at least about 300%.

Exemplary low modulus thermoplastic elastomers include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber, and also blends of different elastomeric materials, or blends of elastomeric materials with one or more thermoplastics.

Exemplary low modulus polymers also include block copolymers of conjugated dienes and vinyl aromatic monomers, including butadiene and isoprene conjugated diene elastomers, as well as styrene, vinyl toluene and t-butyl styrene conjugated aromatic monomers. Block copolymers incorporating polyisoprene may be hydrogenated to produce thermoplastic elastomers having saturated hydrocarbon elastomer segments. Such block copolymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81, including styrenic block copolymers sold under the trademark KRATON® commercially produced by Kraton Polymers, such as their KRATON® brand polystyrene-polyisoprene-polystyrene block copolymers. Also known are resin dispersions of styrene-isoprene-styrene (SIS) block copolymer sold under the trademark PRINLIN® and commercially available from Henkel Technologies, based in Dusseldorf, Germany.

Suitable high modulus, rigid materials, which are particularly useful for forming hard armor articles such as helmets, have a higher initial tensile modulus substantially greater than 6,000 psi. Known high modulus, rigid polymeric binder materials include polyurethanes (both ether and ester based), thermoplastic epoxies, thermoplastic polyacrylates, thermoplastic phenolic/polyvinyl butyral (PVB) polymers, thermoplastic vinyl ester polymers, thermoplastic styrene-butadiene block copolymers, as well as mixtures of polymers. Some of the above materials, such as epoxies, also have thermoset varieties which are less suitable herein. The polymeric binder, whether a low modulus material or a high modulus material, may also include fillers such as carbon black or silica, may be extended with oils, or may be vulcanized by sulfur, peroxide, metal oxide or radiation cure systems as is well known in the art.

Also useful are viscoelastic polar resins or viscoelastic polar polymers, particularly viscoelastic polyurethanes within the range of both soft and rigid materials at a tensile modulus ranging from about 2,000 psi (13.79 MPa) to about 8,000 psi (55.16 MPa). Such polyurethanes are preferably applied as aqueous polyurethane dispersions, preferably cosolvent free aqueous dispersions. Such includes aqueous anionic polyurethane dispersions, aqueous cationic polyurethane dispersions and aqueous nonionic polyurethane dispersions. Particularly useful are aqueous aliphatic polyurethane dispersions, particularly cosolvent-free aqueous anionic, aliphatic polyurethane dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Also useful are all corresponding variations (polyester-based; aliphatic polyester-based; polyether-based; aliphatic polyether-based, etc.) of aqueous cationic and aqueous nonionic dispersions. The most preferred polyurethanes are aliphatic polyurethanes having a tensile modulus at 100% elongation of about 700 psi or more, with a preferred range of 700 psi to about 3000 psi. More preferred are aliphatic polyurethanes having a modulus at 100% elongation of about 1000 psi or more, and still more preferably about 1100 psi or more. Still more preferred is an aliphatic, polyether-based anionic polyurethane having a modulus of 1000 psi or more, preferably 1100 psi or more. All of said polyurethanes are most preferably applied as dispersions in water.

As noted previously, whether low modulus or high modulus, suitable binders are viscoelastic polymers. Viscoelasticity is property of materials that exhibit both viscous and elastic characteristics when undergoing deformation. Viscoelastic materials dissipate energy when a load is applied and then removed. The use of a viscoelastic binder provides the overall composite with enhanced viscoelasticity, and this viscoelastic behavior makes the composites particularly effective in absorbing and dissipating projectile energy, and facilitates the ability of the composite to retract after the projectile is stopped. Among the aforementioned binder polymer types, the most preferred are those which are viscoelastic, i.e. have both viscous and elastic characteristics. Such includes all of the polymers identified above as elastomers.

The rigidity, impact and ballistic properties of the articles formed from the composites of this disclosure are affected by the tensile modulus of the polymeric binder polymer coating the fibers. For example, U.S. Pat. No. 4,623,574 discloses that fiber reinforced composites constructed with elastomeric matrices having tensile moduli less than about 6,000 psi (41,300 kPa) have superior ballistic properties compared both to composites constructed with higher modulus polymers, and also compared to the same fiber structure without a polymeric binder material. However, low tensile modulus polymeric binder material polymers also yield lower rigidity composites. Further, in certain applications, particularly those where a composite must function in both anti-ballistic and structural modes, there is needed a superior combination of ballistic resistance and rigidity. Accordingly, the most appropriate type of polymeric binder polymer to be used will vary depending on the type of article to be formed from the composites of this disclosure. In order to achieve a compromise in both properties, a suitable polymeric binder may combine both low modulus and high modulus materials to form a single polymeric binder.

It has in fact been unexpectedly found that a composite having excellent resistance to backface deformation, very low time-to-peak displacement and an outstanding index of retraction (e.g., greater than 23%) can be achieved, without sacrificing ballistic penetration resistance, by using an elastomeric, viscoelastic polymeric binder having a tensile modulus (i.e., modulus of elasticity) of 400 MPa or greater. In this regard, particularly preferred high modulus, viscoelastic polymers are the polyurethanes described in U.S. Pat. No. 8,357,767, which is incorporated herein by reference to the extent consistent herewith, which have a tensile modulus of 400 MPa or greater, or more particularly, from 400 MPa to 2000 MPa, a tensile strength in the range of 10 to 100 MPa, and elongation at failure in the range of 30% to 400% at a temperature between 0° and 60° C. and at a relative humidity of between 0% and 100%.

The polymeric binder material may be applied either simultaneously or sequentially to a plurality of fibers arranged as a fiber web (e.g. a parallel array or a felt) to form a coated web, applied to a woven fabric to form a coated woven fabric, or as another arrangement, to thereby impregnate the fiber layers with the binder. As used herein, the term "impregnated with" is synonymous with "embedded in" as well as "coated with" or otherwise applied with the coating where the binder material diffuses into the fiber layer and is not simply on a surface of the fiber layers. The polymeric material may also be applied onto at least one array of fibers that is not part of a fiber web, followed by weaving the fibers into a woven fabric or followed by formulating a non-woven fabric following the methods described previously herein. Techniques of forming woven and non-woven fiber plies, layers and fabrics are well known in the art.

Although not required, fibers forming woven fiber layers are at least partially coated with a polymeric binder, followed by a consolidation step similar to that conducted with non-woven fiber layers. Such a consolidation step may be conducted to merge multiple woven fiber layers with each other, or to further merge the binder with the fibers of said woven fabric. For example, a plurality of woven fiber layers do not necessarily have to be consolidated, and may be attached by other means, such as with a conventional adhesive, or by stitching.

Generally, a polymeric binder coating is necessary to efficiently merge, i.e. consolidate, a plurality of non-woven fiber plies. The polymeric binder material may be applied onto the entire surface area of the individual fibers or only onto a partial surface area of the fibers. Most preferably, the coating of the polymeric binder material is applied onto substantially all the surface area of each individual fiber forming a fiber layer of this disclosure. Where a fiber layer comprises a plurality of yarns, each fiber forming a single strand of yarn is preferably coated with the polymeric binder material.

Any appropriate application method may be utilized to apply the polymeric binder material and the term "coated" is not intended to limit the method by which it is applied onto the filaments/fibers. The polymeric binder material is applied directly onto the fiber surfaces using any appropriate method that would be readily determined by one skilled in the art, and the binder then typically diffuses into the fiber layer as discussed herein. For example, the polymeric binder materials may be applied in solution, emulsion or dispersion form by spraying, extruding or roll coating a solution of the polymer material onto fiber surfaces, wherein a portion of the solution comprises the desired polymer or polymers and a portion of the solution comprises a solvent capable of dissolving or dispersing the polymer or polymers, followed by drying. Alternately, the polymeric binder material may be extruded onto the fibers using conventionally known techniques, such as through a slot-die, or through other techniques such as direct gravure, Meyer rod and air knife systems, which are well known in the art. Another method is to apply a neat polymer of the binder material onto fibers either as a liquid, a sticky solid or particles in suspension or as a fluidized bed. Alternatively, the coating may be applied as a solution, emulsion or dispersion in a suitable solvent which does not adversely affect the properties of fibers at the temperature of application. For example, the fibers can be transported through a solution of the polymeric binder material to substantially coat the fibers and then dried.

In another coating technique, the fibers may be dipped into a bath of a solution containing the polymeric binder material dissolved or dispersed in a suitable solvent, and then dried through evaporation or volatilization of the solvent. This method preferably at least partially coats each individual fiber with the polymeric material, preferably substantially coating or encapsulating each of the individual fibers and covering all or substantially all of the filament/fiber surface area with the polymeric binder material. The dipping procedure may be repeated several times as required to place a desired amount of polymer material onto the fibers.

Other techniques for applying a coating to the fibers may be used, including coating of a gel fiber precursor when appropriate, such as by passing the gel fiber through a solution of the appropriate coating polymer under conditions to attain the desired coating. Alternatively, the fibers may be extruded into a fluidized bed of an appropriate polymeric powder.

While it is necessary that the fibers be coated with a polymeric binder after the partial removal of the fiber surface finish, and after the optional surface treatment that enhances the adsorbability of a subsequently applied adsorbate on the fiber surfaces, the fibers may be coated with the polymeric binder either before or after the fibers are arranged into one or more plies/layers, or before or after the fibers are woven into a woven fabric. Woven fabrics may be formed using techniques that are well known in the art using any fabric weave, such as plain weave, crowfoot weave, basket weave, satin weave, twill weave and the like. Either prior to or after weaving, the individual fibers of each woven fabric material may or may not be coated with the polymeric binder material. Typically, weaving of fabrics is performed prior to coating fibers with the polymeric binder, where the woven fabrics are thereby impregnated with the binder. However, this disclosure is not intended to be limited by the stage at which the polymeric binder is applied to the fibers, nor by the means used to apply the polymeric binder.

Methods for the production of non-woven fabrics are well known in the art. In the preferred embodiments herein, a plurality of fibers are arranged into at least one array, typically being arranged as a fiber web comprising a plurality of fibers aligned in a substantially parallel, unidirectional array. As previously stated, in a typical process for forming non-woven unidirectionally aligned fiber plies, fiber bundles are supplied from a creel and led through guides and one or more spreader bars into a collimating comb, followed by coating the fibers with a polymeric binder material. A typical fiber bundle will have from about 30 to about 2000 individual fibers. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other. At this point, removing the fiber surface finish before or during this spreading step may enhance and accelerate the spreading of the fibers into such a parallel array.

After the fibers are coated with the binder material, the coated fibers are formed into non-woven fiber layers that comprise a plurality of overlapping, non-woven fiber plies that are consolidated into a single-layer, monolithic element. In a preferred non-woven fabric structure of this disclosure, a plurality of stacked, overlapping unitapes are formed wherein the parallel fibers of each single ply (unitape) are positioned orthogonally to the parallel fibers of each adjacent single ply relative to the longitudinal fiber direction of each single ply. The stack of overlapping non-woven fiber plies is consolidated under heat and pressure, or by adhering the coatings of individual fiber plies, to form a single-layer, monolithic element which has also been referred to in the art as a single-layer, consolidated network where a "consolidated network" describes a consolidated (merged) combination of fiber plies with the polymeric matrix/binder. Articles of this disclosure may also comprise hybrid consolidated combinations of woven fabrics and non-woven fabrics, as well as combinations of non-woven fabrics formed from unidirectional fiber plies and non-woven felt fabrics.

Most typically, non-woven fiber layers or fabrics include from 1 to about 6 plies, but may include as many as about 10 to about 20 plies as may be desired for various applications. The greater the number of plies translates into greater ballistic resistance, but also greater weight. Accordingly, the number of fiber plies forming a fiber layer composite and/or fabric composite or an article of this disclosure varies depending upon the ultimate use of the fabric or article. For example, in body armor vests for military applications, in order to form an article composite that achieves a desired 1.0 pound per square foot or less areal density (4.9 kg/m$^2$), a total of about 100 plies (or layers) to about 50 individual plies (or layers) may be required, wherein the plies/layers may be woven, knitted, felted or non-woven fabrics (with parallel oriented fibers or other arrangements) formed from the high-strength fibers described herein. In another embodiment, body armor vests for law enforcement use may have a number of plies/layers based on the NIJ threat level. For example, for an NIJ Threat Level IIIA vest, there may be a total of 40 plies. For a lower NIJ Threat Level, fewer plies/layers may be employed. This disclosure allows for the incorporation of a greater number of fiber plies to achieve the desired level of ballistic protection without increasing the fabric weight as compared to other known ballistic resistant structures.

As is conventionally known in the art, excellent ballistic resistance is achieved when individual fiber plies are cross-plied such that the fiber alignment direction of one ply is rotated at an angle with respect to the fiber alignment direction of another ply. Most preferably, the fiber plies are cross-plied orthogonally at 0° and 90° angles, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith.

Methods of consolidating fiber plies to form fiber layers and composites are well known, such as by the methods described in U.S. Pat. No. 6,642,159. Consolidation can occur via drying, cooling, heating, pressure or a combination thereof. Heat and/or pressure may not be necessary, as the fibers or fabric layers may just be glued together, as is the case in a wet lamination process. Typically, consolidation is done by positioning the individual fiber plies on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder coating can be caused to stick or flow without completely melting. However, generally, if the polymeric binder material (if it is one that is capable of melting) is caused to melt, relatively little pressure is required to form the composite, while if the binder material is only heated to a sticking point, more pressure is typically required. As is conventionally known in the art, consolidation may be conducted in a calender set, a flat-bed laminator, a press or in an autoclave. Most commonly, a plurality of orthogonal fiber webs are "glued" together with the binder polymer and run through a flat-bed laminator to improve the uniformity and strength of the bond. Further, the consolidation and polymer application/bonding steps may comprise two separate steps or a single consolidation/lamination step.

Alternately, consolidation may be achieved by molding under heat and pressure in a suitable molding apparatus. Generally, molding is conducted at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the composite panels of this disclosure are molded typically has a direct effect on the stiffness or flexibility of the resulting molded product. Molding at a higher pressure generally produces stiffer materials, up to a certain limit. In addition to the molding pressure, the quantity, thickness and composition of the fiber plies and polymeric binder coating type also directly affects the stiffness of the articles formed from the composites.

While each of the molding and consolidation techniques described herein are similar, each process is different. Particularly, molding is a batch process and consolidation is a generally continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft (flexible) body armor fabrics. Molding is typically reserved for the manufacture of hard armor, e.g. rigid plates. In either process, suitable temperatures, pressures and times are generally dependent on the type of polymeric binder coating materials, polymeric binder content, process used and fiber type. Most preferably, the panels described herein are molded panels formed by high pressure molding techniques.

To produce a composite article having sufficient ballistic resistance properties, the total weight of the binder/matrix coating preferably comprises from about 2% to about 50% by weight, more preferably from about 5% to about 30%, more preferably from about 7% to about 20%, and most preferably from about 11% to about 16% by weight of the fibers plus the weight of the coating, wherein 16% is most preferred for non-woven fabrics. A lower binder/matrix content is appropriate for woven fabrics, wherein a polymeric binder content of greater than zero but less than 10% by weight of the fibers plus the weight of the coating is typically most preferred. This is not intended as limiting.

Following weaving or consolidation of the fiber layers, an optional thermoplastic polymer layer may be attached to one or both of the outer surfaces of the fibrous composite via conventional methods. Suitable polymers for the thermoplastic polymer layer non-exclusively include thermoplastic polymers non-exclusively may be selected from the group consisting of polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Also useful are natural and synthetic rubber polymers. Of these, polyolefin and polyamide layers are preferred. The preferred polyolefin is a polyethylene. Non-limiting examples of useful polyethylenes are low density polyethylene (LDPE), linear low density polyethylene (LLDPE), Medium Density Polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Also useful are SPUNFAB® polyamide webs commercially available from Spunfab, Ltd, of Cuyahoga Falls, Ohio (trademark registered to Keuchel Associates, Inc.), as well as THERMOPLAST™ and HELIOPLAST™ webs, nets and films, commercially available from Protechnic S.A. of Cernay, France. The thermoplastic polymer layer may be bonded to the composite surfaces using well known techniques, such as thermal lamination. Typically, laminating is done by positioning the individual layers on one another under conditions of sufficient heat and pressure to cause the layers to combine into a unitary film. The individual layers are positioned on one another, and the combination is then typically passed through the nip of a pair of heated laminating rollers by techniques well known in the art. Lamination heating may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours.

The thickness of the individual fabrics/composites/fiber layers will correspond to the thickness of the individual fibers and the number of fiber layers incorporated into a fabric. A preferred woven fabric will have a preferred thickness of from about 25 µm to about 600 µm per layer, more preferably from about 50 µm to about 385 µm and most preferably from about 75 µm to about 255 µm per layer. A preferred non-woven fabric, i.e. a non-woven, single-layer, consolidated network, will have a preferred thickness of from about 12 µm to about 600 µm, more preferably from about 50 µm to about 385 µm and most preferably from about 75 µm to about 255 µm, wherein a single-layer, consolidated network typically includes two consolidated plies (i.e. two unitapes). Any thermoplastic polymer layers are preferably very thin, having preferred layer thicknesses of from about 1 µm to about 250 µm, more preferably from about 5 µm to about 25 µm and most preferably from about 5 µm to about 9 µm. Discontinuous webs such as SPUNFAB® non-woven webs are preferably applied with a basis weight of 6 grams per square meter (gsm). While such thicknesses are preferred, it is to be understood that other thicknesses may be produced to satisfy a particular need and yet fall within the scope of the present disclosure.

The fabrics/composites of this disclosure will have a preferred areal density prior to consolidation/molding of from about 20 grams/m$^2$ (0.004 lb/ft$^2$ (psf)) to about 1000 gsm (0.2 psf). More preferable areal densities for the fabrics/composites of this disclosure prior to consolidation/molding will range from about 30 gsm (0.006 psf) to about 500 gsm (0.1 psf). The most preferred areal density for fabrics/composites of this disclosure will range from about 50 gsm (0.01 psf) to about 250 gsm (0.05 psf) prior to consolidation/molding. Panels and articles of this disclosure comprising multiple fiber layers stacked one upon another and consolidated will have a preferred composite areal density of from about 1000 gsm (0.2 psf) to about 40,000 gsm (8.0 psf), more preferably from about 2000 gsm (0.40 psf) to about 30,000 gsm (6.0 psf), more preferably from about 3000 gsm (0.60 psf) to about 20,000 gsm (4.0 psf), still more preferably from about 3750 gsm (0.75 psf) to about 15,000 gsm (3.0 psf) and most preferably at least about 5000 gsm (1.0 psf) to about 15,000 gsm (3.0 psf). A typical range for composite articles shaped into helmets is from about 7,500 gsm (1.50 psf) to about 12,500 gsm (2.50 psf).

The fabrics of this disclosure may be used in various applications to form a variety of different ballistic resistant articles using well known techniques, including flexible, soft armor articles as well as rigid, hard armor articles. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758, all of which are incorporated herein by reference to the extent not incompatible herewith. The composites are particularly useful for the formation of hard armor and shaped or unshaped sub-assembly intermediates formed in the process of fabricating hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. Such hard articles are preferably, but not exclusively, formed using a high tensile modulus binder material.

Articles of this disclosure that exhibit an index of retraction of greater than 17% and having an areal density of at least 1.0 lb/ft$^2$ have been found to have a superior ability to defeat high energy rifle bullets, i.e., rifle bullets having a kinetic energy level of at least 1500 joules (Level III bullets), and composites having greater index of retraction values can stop rifle bullets of even greater energy. A composite having an index of retraction of 23% or greater, for example, can stop a rifle bullet having an energy of greater than 4000 joules.

In addition to an index of retraction of greater than 17%, other characteristic properties of the composites of this disclosure enabling them to defeat high energy bullets with minimal backface deformation include a short beam shear strength of 4 ksi or more, preferably 5 ksi or more for a panel having less than 20 wt. % resin content, as determined by ASTM D2334; an in-plane shear strength between adjacent fibrous plies of from about 1 MPa to about 2 MPa, and an effective shear modulus at the bond interface between the fiber surface and the viscoelastic binder material of at least 50 MPa as determined by ASTM E143-13.

The following examples serve to illustrate the novel and inventive features of this disclosure.

Example 1 (Comparative)

A 40 cm×40 cm test panel was molded under heat and molding pressure by stacking 88 layers of commercially available SPECTRA® ultra-high molecular weight fibers coated with a proprietary polyurethane binder (SCM). The fibers were neither washed nor treated to enhance surface energy (e.g. by corona or plasma treatment) prior to coating with the binder. The molding process included inserting a thermocouple in the middle layer of the panel and preheating the stack of materials for 10 minutes at 260° F. with only contact pressure, following by applying 3000 psi molding pressure for 30 minutes in a mold kept at 260° F. After 30 minutes, a cool down cycle was started and the molded panel was pulled out from the mold once the panel mid-section reached 120° F. Ballistic testing was conducted using an AK-47 (7.62 mm×39 mm, Lead Core bullet). The weight of each bullet was 8.1 g. The initial velocities of the bullets were about 830±10 meters/sec. Each panel was firmly clamped on a steel frame using several C-clamps. A FAST-CAM-APX RS 250K high speed video camera along with necessary lighting was used so that the bullet location and deflection of the panel were recorded with minimal shadowing and other interference. The high speed images were measured using a calibrated pattern in the background.

For the first example the impact on the molded SCM panel was video recorded using the FASTCAM-APX RS 250K video camera at 36000 frames per second with a shutter speed of 1/153000 sec. The trigger was initiated when the bullet passed through the field using Oehler Model 57 infrared screens. The impacts on the other three panels were done using 30000 frames per second. Image and data analysis was conducted from the individual frames from the videos were extracted using the image analysis software ImageJ (well-known open source image processing program; developed by the U.S. National Institute of Health for image processing and analysis in Java). The video frames were then analyzed using Abode Photoshop 7 with Image Tool plug-ins. The spatial dimensions of the images were measured using the calibrated pattern in the background in the frames. The profile of the extended back face envelope for each frame were extracted and imported into an Excel spreadsheet for future evaluation.

Example 2 (Comparative)

A 40 cm×40 cm test panel was molded under heat and molding pressure by stacking 155 layers of a comparative commercial material (CCM) comprising cross-plied non-woven layers of ultra-high molecular weight polyethylene fibers coated with a proprietary polyurethane binder. The fibers were neither washed nor treated to enhance surface energy (e.g. by corona or plasma treatment) prior to coating with the binder. As in Example 1, the molding process includes inserting a thermocouple in the middle layer of the panel and preheating the stack of materials for 10 minutes at 260° F. with only contact pressure, following by applying 3000 psi molding pressure for 30 minutes in a mold kept at 260° F. After 30 minutes, a cool down cycle was started and the molded panel was pulled out from the mold once the panel mid-section reached 120° F. Ballistic testing was conducted using AK-47 (7.62 mm×39 mm, Lead Core bullet). A FASTCAM-APX RS 250K high speed video camera was used for recording and image and data analysis was conducted as in Example 1.

Example 3

A 40 cm×40 cm test panel was molded under heat and molding pressure by stacking 138 layers of ultra high tenacity SPECTRA® fibers manufactured using Dynamic Deflection Technology (DDT) as disclosed herein. The fibers were washed to remove 99.0% of the surface finish and then plasma treated prior to application of a proprietary anionic, aliphatic polyester-based polyurethane binder. As in Example 1, the molding process included inserting a thermocouple in the middle layer of the panel and preheating the stack of materials for 10 minutes at 260° F. with only contact pressure, following by applying 3000 psi molding pressure for 30 minutes in a mold kept at 260° F. After 30 minutes, a cool down cycle was started and the molded panel was pulled out from the mold once the panel mid-section reached 120° F. Ballistic testing was conducted using AK-47 (7.62 mm×39 mm, Lead Core). A FASTCAM-APX RS 250K high speed video camera was used for recording and image and data analysis was conducted similar to Example 1.

The result of the testing is shown in FIG. 3 which clearly illustrates the reduced deflection of the DDT panel compared to both the CCM and SCM panels.

While the present disclosure has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiment, those alternatives which have been discussed above and all equivalents thereto.

What is claimed is:

1. A viscoelastic, deflection resistant fibrous composite panel comprising a consolidated plurality of non-woven fibrous plies, each of said non-woven fibrous plies comprising a plurality of fibers having a tenacity of at least 35 g/denier and said fibers having surfaces that are greater than 50% free of a fiber surface finish, wherein the fibers of said fibrous composite are coated with a viscoelastic binder material that comprises a polyurethane having a modulus of elasticity of 400 MPa to 2000 MPa, wherein said binder is bonded to the fiber surfaces, and wherein the composite has an index of retraction of at least 17% when impacted by a projectile having sufficient kinetic energy to cause a deflection of the panel at its impact site.

2. The composite panel of claim 1 wherein said fibers are ultra-high molecular weight polyethylene fibers.

3. The composite panel of claim 1 wherein the composite has an index of retraction of at least 23%.

4. The composite panel of claim 1 wherein the panel exhibits retractive behavior wherein the deflection of the panel at the impact site reaches a peak deflection and then partially retracts, wherein a ratio of the peak deflection to the amount of retraction is less than 6.0:1.

5. The composite panel of claim 1 wherein the panel has a short beam shear strength of at least 4 ksi for a composite having a binder content of less than 20 weight %, as determined by ASTM D2334.

6. The composite panel of claim 1 wherein the bond interface between the fiber surface and the viscoelastic binder material has an effective shear modulus of at least 50 MPa as determined by ASTM E143-13.

7. The composite panel of claim 1 wherein said composite panel has an in-plane shear strength between fibrous plies of from about 1 MPa to about 2 MPa.

8. The composite panel of claim 1 wherein said panel has an areal density of at least 1.0 lb/ft$^2$ and is capable of preventing the penetration of a rifle bullet projectile having an energy level of at least 1500 joules.

9. The composite panel of claim 1 wherein said fibers have been corona treated with an energy flux of from 2 Watts/ft$^2$/min to 100 Watts/ft$^2$/min.

10. The composite panel of claim 1 wherein said fibers have been plasma treated with an energy flux of 100 W/ft$^2$/min or less.

11. A viscoelastic, deflection resistant fibrous composite panel comprising a consolidated plurality of non-woven fibrous plies, each of said non-woven fibrous plies comprising a plurality of fibers having a tenacity of at least 35 g/denier and said fibers having surfaces that are greater than 50% free of a fiber surface finish, wherein the fibers of said fibrous composite are coated with a viscoelastic binder material, wherein said binder is bonded to the fiber surfaces, and wherein the composite has an index of retraction of at least 17% when impacted by a projectile having sufficient kinetic energy to cause a deflection of the panel at its impact site, and wherein the viscoelastic binder material comprises a polyurethane having a modulus of elasticity of from 400 MPa to 2000 MPa, a tensile strength in the range of 10 to 100 MPa, and elongation at failure in the range of 30% to 400% at a temperature between 0° and 60° C. and at a relative humidity of between 0% and 100%.

* * * * *